US008218416B2

(12) United States Patent
Umezawa et al.

(10) Patent No.: US 8,218,416 B2
(45) Date of Patent: ＊Jul. 10, 2012

(54) MULTI-LAYER OPTICAL DISC, INFORMATION RECORDING METHOD AND INFORMATION REPRODUCING METHOD

(75) Inventors: Kazuyo Umezawa, Yokohama (JP); Seiji Morita, Yokohama (JP); Koji Takazawa, Tokyo (JP); Hideo Ando, Hino (JP); Yasuaki Ootera, Yokohama (JP); Naomasa Nakamura, Yokohama (JP); Naoki Morishita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/973,196

(22) Filed: Dec. 20, 2010

(65) Prior Publication Data

US 2011/0085434 A1    Apr. 14, 2011

Related U.S. Application Data

(62) Division of application No. 11/755,451, filed on May 30, 2007, now Pat. No. 7,869,339.

(30) Foreign Application Priority Data

May 31, 2006   (JP) .................................. 2006-152718

(51) Int. Cl.
*G11B 7/00* (2006.01)
*G11B 7/24* (2006.01)

(52) U.S. Cl. ............... 369/275.3; 369/275.1; 369/59.11; 369/47.5; 369/53.45

(58) Field of Classification Search ........................ None
See application file for complete search history.

(56) References Cited

U.S. PATENT DOCUMENTS

| 6,650,607 | B1 | 11/2003 | Kando et al. |
| 7,019,273 | B2* | 3/2006 | Yokoi ........................ 250/201.5 |
| 7,688,696 | B2 | 3/2010 | Ushiyama |
| 7,869,339 | B2* | 1/2011 | Umezawa et al. ......... 369/275.3 |
| 2003/0067857 | A1 | 4/2003 | Shirota et al. |
| 2003/0081523 | A1 | 5/2003 | Miyagawa et al. |
| 2004/0190418 | A1 | 9/2004 | Inoue et al. |

(Continued)

FOREIGN PATENT DOCUMENTS

CN             1723489 A           1/2006
(Continued)

OTHER PUBLICATIONS

Office Action mailed on Dec. 20, 2010, in Taiwan Patent Application No. 096119182.

(Continued)

*Primary Examiner* — Muhammad N Edun
(74) *Attorney, Agent, or Firm* — Oblon, Spivak, McClelland, Maier & Neustadt, L.L.P.

(57) ABSTRACT

According to one embodiment, single-sided dual-layer recordable disc 100 may be used. Information recording is performed by forming mark and space portions on data area DA using modulated laser power. Pp denotes the maximum laser power or peak power for forming the mark portion, and Pb denotes the bias power for forming the space portion. Power ratio Pb/Pp is calculated for each of recording layers L0 and L1. Information is recorded on any of the recording layers L0 and L1 based on the result of calculation. Here, the calculated power ratio Pb/Pp changes among the recording layers L0 and L1, thereby optimizing the recording condition for a multi-layer recordable optical disc within relatively short time.

4 Claims, 11 Drawing Sheets

U.S. PATENT DOCUMENTS

| | | |
|---|---|---|
| 2004/0218498 A1 | 11/2004 | Ahn et al. |
| 2005/0007916 A1 | 1/2005 | Kim et al. |
| 2005/0025012 A1 | 2/2005 | Watabe |
| 2005/0047317 A1 | 3/2005 | Watanabe et al. |
| 2005/0213477 A1 | 9/2005 | Kato et al. |
| 2005/0243676 A1 | 11/2005 | Kato et al. |
| 2005/0259576 A1 | 11/2005 | Nakamura et al. |
| 2006/0023588 A1 | 2/2006 | Miyagawa et al. |

FOREIGN PATENT DOCUMENTS

| | | |
|---|---|---|
| EP | 1 868 185 A1 | 12/2007 |
| JP | H07-85527 | 3/1995 |
| JP | H09-282660 | 10/1997 |
| JP | 2001-351249 | 12/2001 |
| JP | 2003-109217 | 4/2003 |
| JP | 2004-47053 | 2/2004 |
| JP | 2004-63002 | 2/2004 |
| JP | 2004-206849 | 7/2004 |
| JP | 2004-213753 | 7/2004 |
| JP | 2004-213808 | 7/2004 |
| JP | 2004-295948 | 10/2004 |
| JP | 2005-11406 | 1/2005 |
| JP | 2005-100491 | 4/2005 |
| JP | 2005-166096 | 6/2005 |
| JP | 2005-174528 | 6/2005 |
| JP | 2005-332579 | 12/2005 |
| JP | 2005-346847 | 12/2005 |
| TW | 200606840 | 2/2006 |
| WO | WO 03/105139 A1 | 12/2003 |
| WO | WO 2005/104099 A1 | 11/2005 |
| WO | WO 2006/049006 A1 | 5/2006 |

OTHER PUBLICATIONS

Office Action issued on Aug. 30, 2011 in the corresponding Japanese Patent Application No. 2009-289014.

* cited by examiner

Structure of Control Data Zone

Structure of Data Segement in Control Data Section

Physical Format Information

| BP | Contents |
|---|---|
| 0 | Book type and part version |
| 1 | Disc size and maximum transfer rate of the disc |
| 2 | Disc structure |
| 3 | Recording density |
| 4 to 15 | Data area allocation |
| 16 | BCA descriptor |
| 17 | Revision number of maximum recording speed |
| 18 | Revision number of minimum recording speed |
| 19 to 25 | Revision number table |
| 26 | Class |
| 27 | Extended part version |
| 28 to 31 | reserved |
| 32 | Actual number of maximum reading speed |
| 33 | Layer format table |
| 34 to 127 | reserved |
| 128 | Mark polarity descriptor |
| 129 | Velocity |
| 130 | Rim intensity in tangential direction |
| 131 | Rim intensity in radial direction |
| 132 | Read power |
| 133 | Actual number of minimum recording speed |
| 134 | Actual number of 2nd recording speed |
| 135 | Actual number of 3rd recording speed |
| 136 | Actual number of 4th recording speed |
| 137 | Actual number of 5th recording speed |
| 138 | Actual number of 6th recording speed |
| 139 | Actual number of 7th recording speed |
| 140 | Actual number of 8th recording speed |
| 141 | Actual number of 9th recording speed |
| 142 | Actual number of 10th recording speed |
| 143 | Actual number of 11th recording speed |
| 144 | Actual number of 12th recording speed |
| 145 | Actual number of 13th recording speed |
| 146 | Actual number of 14th recording speed |
| 147 | Actual number of 15th recording speed |
| 148 | Actual number of maximum recording speed |
| 149 | Reflectivity of data area for layer 0 |
| 150 | Push-pull signal for layer 0 |
| 151 | On track signal for layer 0 |
| 152 | Reflectivity of data area for layer 1 |
| 153 | Push-pull signal for layer 1 |
| 154 | On track signal for layer 1 |
| 155 to 2047 | reserved |

FIG. 6  Note : BP 0 to BP 31 comprise the common data used for the DVD family.
BP 32 to BP 2047 area used for unique information for each book.

Data Area Allocation

| BP | Contents |
|---|---|
| 4 | 00h |
| 5 to 7 | Start PSN of the data area (04 0000h) |
| 8 | 00h |
| 9 to 11 | Maximum PSN of data recordable area (FB CCFFh) |
| 12 | 00h |
| 13 to 15 | End PSN on Layer 0 (73 DBFFh) |

FIG. 7

Physical Format Information (L0)

| BP | Contents |
|---|---|
| 0 to 511 | |
| 512 | Peak power for layer 0 |
| 513 | Bias power1 for layer 0 |
| 514 | Bias power2 for layer 0 |
| 515 | Bias power3 for layer 0 |
| 516 | First pulse end time for layer 0 |
| 517 | Multi pulse duration for layer 0 |
| 518 | Last pulse duration for layer 0 |
| 519 | Bias power2 duration for layer 0, 2T mark |
| 520 | Bias power2 duration for layer 0, 3T mark |
| 521 | Bias power2 duration for layer 0, ≧4T mark |
| 522 | First pulse start time for layer 0, 2T mark, leading 2T space |
| 523 | First pulse start time for layer 0, 3T mark, leading 2T space |
| 524 | First pulse start time for layer 0, ≧4T mark, leading 2T space |
| 525 | First pulse start time for layer 0, 2T mark, leading 3T space |
| 526 | First pulse start time for layer 0, 3T mark, leading 3T space |
| 527 | First pulse start time for layer 0, ≧4T mark, leading 3T space |
| 528 | First pulse start time for layer 0, 2T mark, leading ≧4T space |
| 529 | First pulse start time for layer 0, 3T mark, leading ≧4T space |
| 530 | First pulse start time for layer 0, ≧4T mark, leading ≧4T space |
| 531 | Last pulse end time for layer 0, 2T mark, trailing 2T space |
| 532 | Last pulse end time for layer 0, 3T mark, trailing 2T space |
| 533 | Last pulse end time for layer 0, ≧4T mark, trailing 2T space |
| 534 | Last pulse end time for layer 0, 2T mark, trailing 3T space |
| 535 | Last pulse end time for layer 0, 3T mark, trailing 3T space |
| 536 | Last pulse end time for layer 0, ≧4T mark, trailing 3T space |
| 537 | Last pulse end time for layer 0, 2T mark, trailing ≧4T space |
| 538 | Last pulse end time for layer 0, 3T mark, trailing ≧4T space |
| 539 | Last pulse end time for layer 0, ≧4T mark, trailing ≧4T space |
| 540 to 543 | reserved |

FIG. 8

Physical Format Information (L1)

| BP | Contents |
|---|---|
| 544 | Peak power for layer 1 |
| 545 | Bias power1 for layer 1 |
| 546 | Bias power2 for layer 1 |
| 547 | Bias power3 for layer 1 |
| 548 | First pulse end time for layer 1 |
| 549 | Multi pulse duration for layer 1 |
| 550 | Last pulse start time for layer 1 |
| 551 | Bias power2 duration for layer 1, 2T mark |
| 552 | Bias power2 duration for layer 1, 3T mark |
| 553 | Bias power2 duration for layer 1, $\geq$4T mark |
| 554 | First pulse start time for layer 1, 2T mark, leading 2T space |
| 555 | First pulse start time for layer 1, 3T mark, leading 2T space |
| 556 | First pulse start time for layer 1, $\geq$4T mark, leading 2T space |
| 557 | First pulse start time for layer 1, 2T mark, leading 3T space |
| 558 | First pulse start time for layer 1, 3T mark, leading 3T space |
| 559 | First pulse start time for layer 1, $\geq$4T mark, leading 3T space |
| 560 | First pulse start time for layer 1, 2T mark, leading $\geq$4T space |
| 561 | First pulse start time for layer 1, 3T mark, leading $\geq$4T space |
| 562 | First pulse start time for layer 1, $\geq$4T mark, leading $\geq$4T space |
| 563 | Last pulse end time for layer 1, 2T mark, trailing 2T space |
| 564 | Last pulse end time for layer 1, 3T mark, trailing 2T space |
| 565 | Last pulse end time for layer 1, $\geq$4T mark, trailing 2T space |
| 566 | Last pulse end time for layer 1, 2T mark, trailing 3T space |
| 567 | Last pulse end time for layer 1, 3T mark, trailing 3T space |
| 568 | Last pulse end time for layer 1, $\geq$4T mark, trailing 3T space |
| 569 | Last pulse end time for layer 1, 2T mark, trailing $\geq$4T space |
| 570 | Last pulse end time for layer 1, 3T mark, trailing $\geq$4T space |
| 571 | Last pulse end time for layer 1, $\geq$4T mark, trailing $\geq$4T space |
| 572 to 2047 | reserved |

Note : BP 0 to BP 31 comprise the common data used for the DVD family.
      BP 32 to BP 2047 area used for unique information for each book.
      T denotes the channel clock period.

FIG. 9

MULTI-LAYER OPTICAL DISC, INFORMATION RECORDING METHOD AND INFORMATION REPRODUCING METHOD

CROSS-REFERENCE TO RELATED APPLICATIONS

This application is a divisional of U.S. application Ser. No. 11/755,451, filed May 30, 2007, and is based upon and claims the benefit of priority from Japanese Patent Application No. 2006-152718, filed May 31, 2006, the entire contents of each of which are incorporated herein by reference.

BACKGROUND

1. Field

One embodiment of the present invention relates to an optical disc (or an information storage medium using light in general concept) by which information can be recorded on or reproduced from two or more recording layers of the one side of the disc, a recording method using the disc, and a reproducing method using the disc.

2. Description of the Related Art

As an optical disc, in general, there are a read-only ROM disc, a recordable or re-recordable R disc, and a rewritable RW or RAM disc. As information becomes bulky, further-large capacity is demanded for an optical disc. For the purpose of increasing the capacity of an optical disc, some technique has been proposed in which a recording capacity is increased by narrowing down a beam spot, for example, in such a manner that a wavelength of a laser beam is shortened, or a numerical aperture NA is enlarged (for example, refer to Jpn. Pat. Appln. KOKAI Publication No. 2004-206849, paragraphs 0036 to 0041, FIG. 1).

As multi-layered optical discs, dual-layer ROM discs are conventionally available in the market. Recently, dual-layer recordable discs (DVD-R:DL) each using a laser of 650 nm wavelength are reduced to practice. In a manner of recording and reproducing an optical disc (such as a DVD-R) using an organic dye material for the recording layer, recording marks in which the reflectivity of the dye has been changed are formed by modulating the power of a laser light. Thus, the information recording is performed utilizing the difference between the reflectivity of recording marks and that of unrecorded portions. As a manner of modulating the laser power, multi-pulses are used for DVD-R, for example (cf. Jpn. Pat. Appln. KOKAI Publication No. 9-282660, abstract).

A single-layer recordable R disc configured to perform recording with a laser wavelength of 405 nm is prepared, and investigation is made for information recording on the disc. It is found that the bias power, which is not so significant matter with the recording of 650 nm laser wavelength, is very significant matter to control the recorded mark length. Thus, the bias power has an effect on recording characteristics. From this, the number of parameters of the recording condition increases, to thereby consume much time to find an optimum recording condition. The inventors discover that an optimum recording condition (for instance, a condition serving to determine the recording power to achieve a minimum error rate where the wavelength and/or the waveform is/are fixed) can be found in short time while changing the recording power with a constant ratio of the recording power (or the peak power of recording pulses) to the bias power, as a given condition.

However, when similar information recording is performed for a dual-layer R disc, a problem occurs. That is, the inventors are faced with a problem that when the ratio of the recording power to the bias power is fixed and recording is performed for each of the layers, even if both the layers are formed of the same recording-layer material, the recording characteristic of one of the layers becomes significantly deteriorated.

Another problem is also found. That is, when an information storage medium (especially a multi-layer optical disc configured to perform high-density recording with a blue laser) is preserved for a long period of time, and/or when the medium is preserved in severe circumstances such as high-temperature and high-humidity, a sufficient time is consumed to find the optimum recording condition, because the optimum recording power may change after the information storage medium is newly manufactured.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 6 is an exemplary view showing contents of the physical format information shown in FIG. 5;

FIG. 7 is an exemplary view showing a data area allocation of the physical format information shown in FIG. 6;

FIG. 8 is an exemplary view showing a part (regarding L0) of the physical format information shown in FIG. 5;

FIG. 9 is an exemplary view showing another part (regarding L1) of the physical format information shown in FIG. 5;

DETAILED DESCRIPTION

Various embodiments according to the invention will be described hereinafter with reference to the accompanying drawings.

One task of the embodiment is to optimize the recording condition for a multi-layer recordable optical disc with a relatively short period of time In a recording method according to one embodiment, information is recorded on a data area (DA) of a multi-layer disc (100) having a plurality of recording layers (L0, L1) wherein mark and space portions are formed using a laser whose output power is modulated. Here, the mark portion is formed with a maximum laser power represented by Pp, and the space portion is formed with a bias power represented by Pb. Then, a power ration Pb/Pp of the bias power Pb to the maximum laser power Pp is calculated (ST16) for each of the recording layers (L0, L1), and information is recorded (ST14-ST22) on any of the recording layers (L0, L1) based on a result of the calculating with a condition that the calculated power ratio Pb/Pp changes among the recording layers (L0, L1). (Since at ST16 the Pb/Pp of L0 is calculated separately from or independently of the Pb/Pp of L1, the former Pb/Pp can differ from the latter Pb/Pp.)

An optimum condition of recording (e.g., a condition determining the recording power to achieve a minimum error rate where the wavelength and the waveform are fixed) on an optical disc having a plurality of recording layers can be found with a relatively short period of time.

Figure 1:
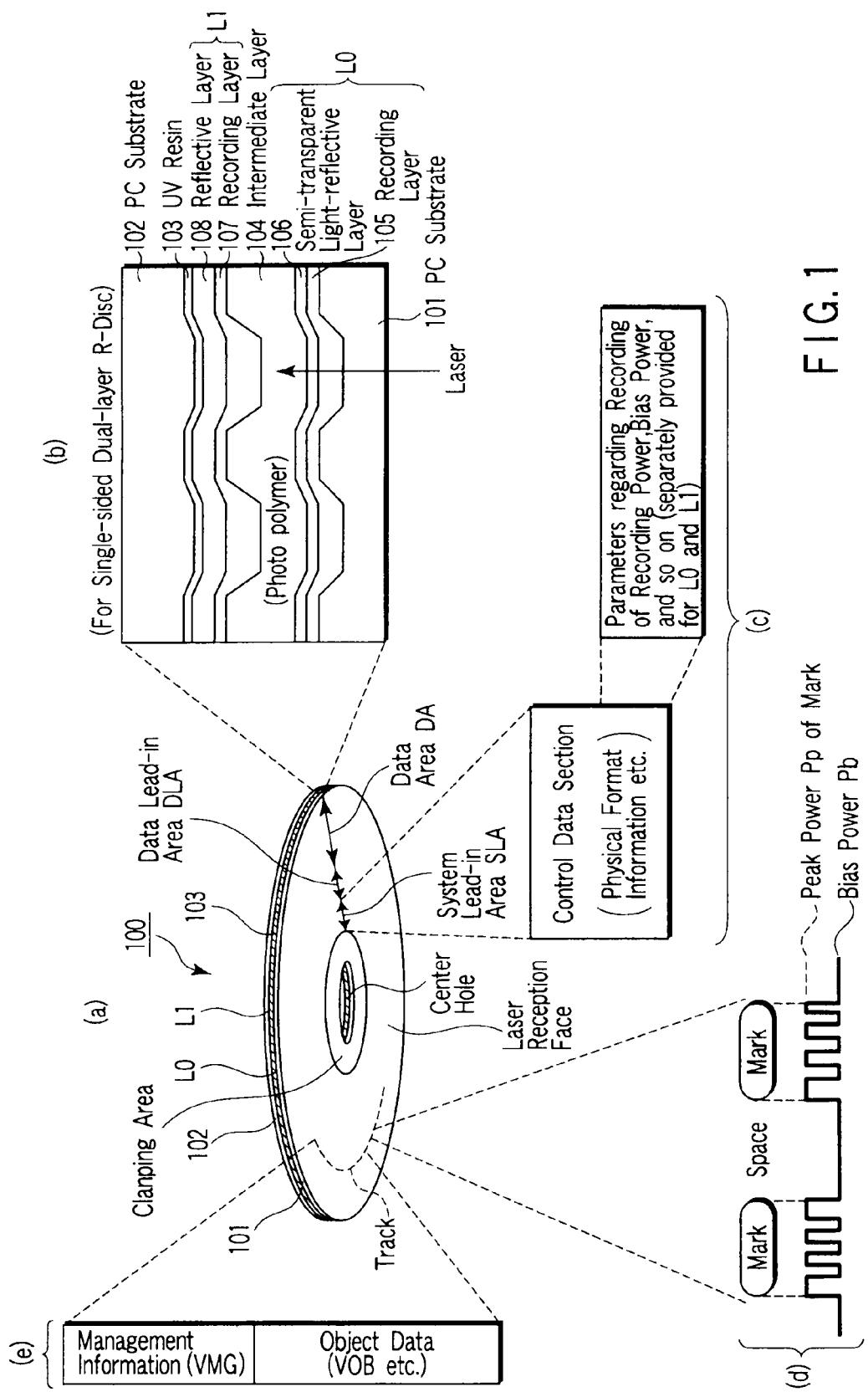
FIG. 1 is an exemplary view illustrating a configuration of a multi-layered optical disc according to an embodiment of the invention.

Various embodiments will be described with reference to the accompanying drawings. FIG. 1 shows an example of the configuration of multi-layer optical disc (a recordable or re-recordable single-sided dual-layer disc as a practical example) 100 according to one of the embodiments. As exemplified by (a) and (b) of FIG. 1, disc 100 comprises transparent resin substrate 101 having a disc-like figure and being formed of a synthetic resin material such as polycarbonate, for example. Grooves are coaxially or spirally formed on transparent resin substrate 101. Transparent resin substrate 101 may be manufactured by injection molding with a stamper.

On transparent resin substrate 101 with 0.59 mm thickness and made of polycarbonate or the like, organic dye recording layer 105 and semi-transparent light-reflection or light-reflective layer 106 are sequentially laminated or stacked for the first layer (L0). Photo Polymer (abbreviated as 2P resin) intermediate layer 104 is spin-coated on layer 106. Then, the groove pattern of the second layer (L1) is transferred to layer 104, and organic dye recording layer 107 and reflection or reflective film 108 of silver or silver alloy are sequentially laminated or stacked for the second layer (L1). To the body on which L0 and L1 recording layers are laminated or stacked, another transparent resin substrate (or dummy substrate) 102 with 0.59 mm thickness is pasted via UV curing resin (adhesive layer) 103. The organic dye recording films (recording layers 105 and 107) have a dual-layer configuration in which semi-transparent reflection or reflective layer 106 and intermediate layer 104 are sandwiched between the organic dye recording films. The total thickness of the resultant pasted optical disc is about 1.2 mm.

On transparent resin substrate 101, spiral grooves with the track pitch of 0.4 µm and the depth of 60 nm, for example, are formed (for respective layers L0 and L1). The grooves are wobbled so that address information is recorded on the wobble. Further, recording layers 105 and 107 each including an organic dye are formed on transparent resin substrate 101 so as to fill-up the grooves.

As the organic dye for forming recording layers 105 and 107, a dye material whose maximum absorption wavelength area is shifted to the longer wavelength side than the recording wavelength (e.g., 405 nm) may be used. Note that the dye material is designed to have a substantially large light absorption at the longer wavelength area (e.g., 450 nm to 600 nm), and the absorption does not disappear at the recording wavelength area.

The organic dye is dissolved in a solvent to provide a liquid material. The recording film thickness can be precisely managed by controlling the dilution rate of the solvent and/or the rotating speed of spin-coating.

A cyanine dye, styryl dye, azo dye, or the like may be used as an organic dye applicable to the embodiment. Particularly, the cyanine dye or the styryl dye is suitable because control of the absorption with respect to the recording wavelength is easy. The azo dye may be obtained as a single azo compound or as a complex of a metal and one or more molecules of an azo compound.

In the embodiment, cobalt, nickel, or copper may be used for the center metal M of the azo metal complex so as to enhance the optical stability. However, without being limited thereto, there may be used for the center metal M of the azo metal complex: scandium, yttrium, titanium, zirconium, hafnium, vanadium, niobium, tantalum, chrome, molybdenum, tungsten, manganese, technetium, rhenium, iron, ruthenium, osmium, rhodium, iridium, palladium, platinum, silver, gold, zinc, cadmium, or mercury and the like.

A low light reflectivity may be met when a recording laser light is focused on or tracking over the track before recording of information. Thereafter, the dye is subjected to a resolving reaction by the laser light to reduce the optical absorption rate, so that the light reflectivity at the recording mark portion is enhanced. From this, a so-called "Low-to-High" (or "L to H") characteristic is obtained wherein the light reflectivity at the recording mark portion formed by irradiating the laser light becomes higher than the light reflectivity obtained before the laser light irradiation.

Incidentally, in transparent resin substrate 101, particularly at the groove bottom portion (of L0 or L1), some deformations may be caused by heat generated due to the irradiation of the recording laser. In this case, in a reproduction process after recording, a phase difference (compared with the case of no heat deformation) could occur in the reflected laser light.

According to the embodiment, a physical format that can be applied to the L0 and L1 layers on transparent resin substrate 101 and photo polymer (2P resin) 104 may be as follows: Namely, general parameters of a recordable single-sided dual-layer disc are almost the same as those of a single-layer disc, expect for the following. That is, the user-available recording capacity is 30 GB, the inner radius of layer 0 (L0 layer) of the data area is 24.6 mm, the inner radius of layer 1 (L1 layer) thereof is 24.7 mm, and the outer radius (of each of layer 0 and layer 1) of the data area is 58.1 mm.

In optical disc 100 of FIG. 1(a), system lead-in area SLA includes a control data section as exemplified by FIG. 1(c). The control data section includes, as a part of physical format information, etc., recording-related parameters such as recording power (peak power), bias power, and the like, for each of L0 and L1.

On the track within data area DA of optical disc 100, as exemplified by FIG. 1(d), mark/space recording is done by the laser with a given recording power (peak power) and bias power. By this mark/space recording, as exemplified by FIG. 1(e), object data (such as VOB) and its management information (VMG) of a high-definition TV broadcasting program, for example, are recorded on the track (of L0 and/or L1) in data area DA.

<<Format of Information Area>>

Figure 2:
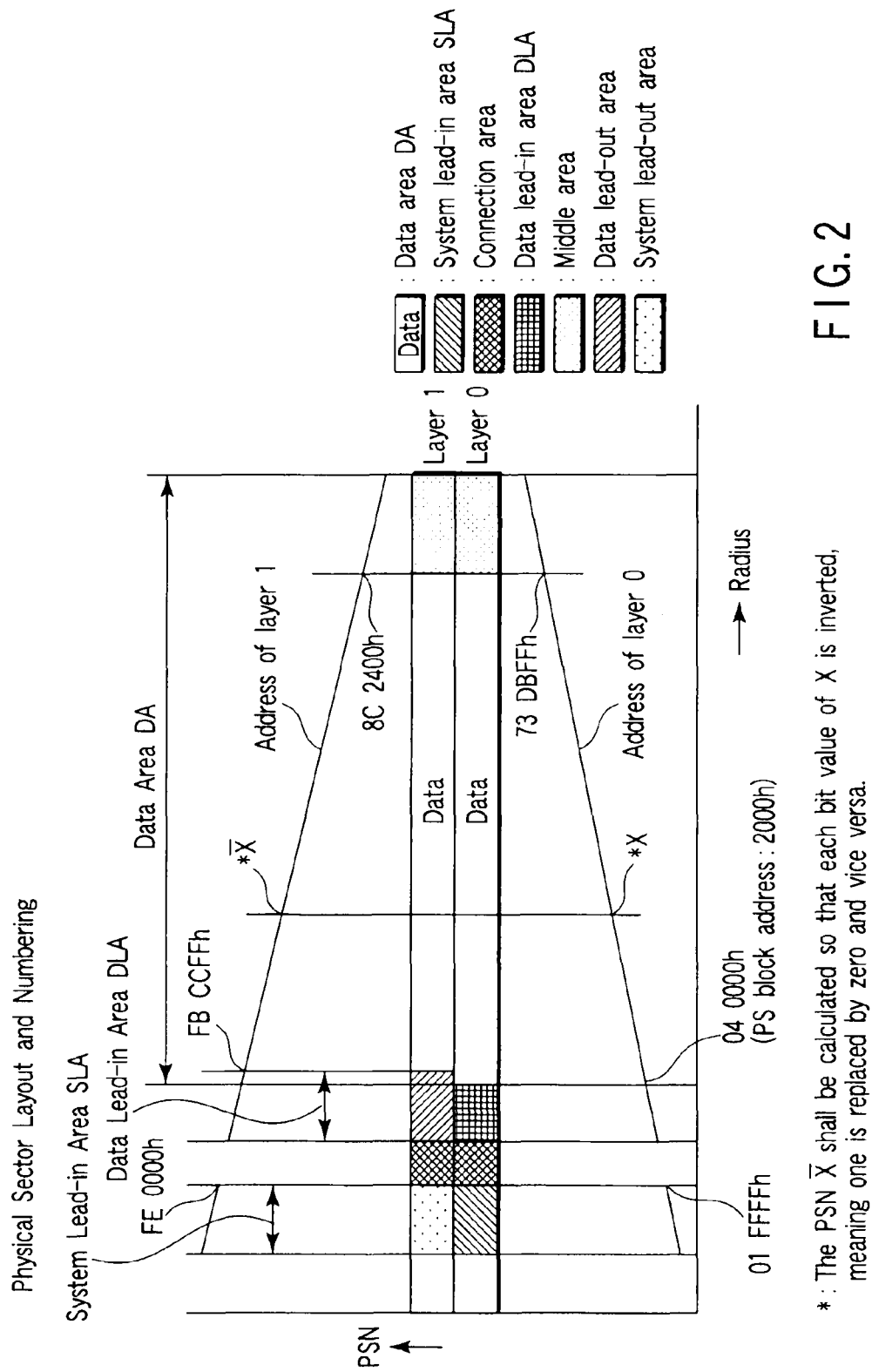
FIG. 2 is an exemplary view showing a physical sector layout of the optical disc shown in FIG. 1.

FIG. 2 is an exemplary view showing a physical sector layout of optical disc 100 shown in FIG. 1. As exemplified in FIG. 2, the information area provided throughout the dual layers includes seven areas: the System Lead-in area, Connection area, Data Lead-in area, Data area, Data Lead-out area, System Lead-out area, and Middle area. The Middle area on each layer allows the read-out beam to move from Layer 0 (L0) to Layer 1 (L1). Data area DA is intended for recording of the main data (such as management information VMG, object data VOB, etc. in the example of FIG. 1(e)). System Lead-in area SLA contains the Control data and Reference code. The Data Lead-out area allows for a continuous smooth read-out.

<<Lead-Out Area>>

The System Lead-in area and System Lead-out area contain tracks which consist of a series of embossed pits. The Data Lead-in area, Data area and Middle area on Layer 0 (L0), and the Middle area, Data area and Data Lead-out area on Layer 1 (L1) include a series of groove tracks. The groove tracks are continuous from the start of the Data Lead-in area to the end of the Middle area on Layer 0 and from the start of the Middle area to the end of the Data Lead-out area on Layer 1. When two single-sided dual-layer discs are pasted on each other, a double-sided quadruplex-layer disc having two read-out surfaces is manufactured.

Figure 3:
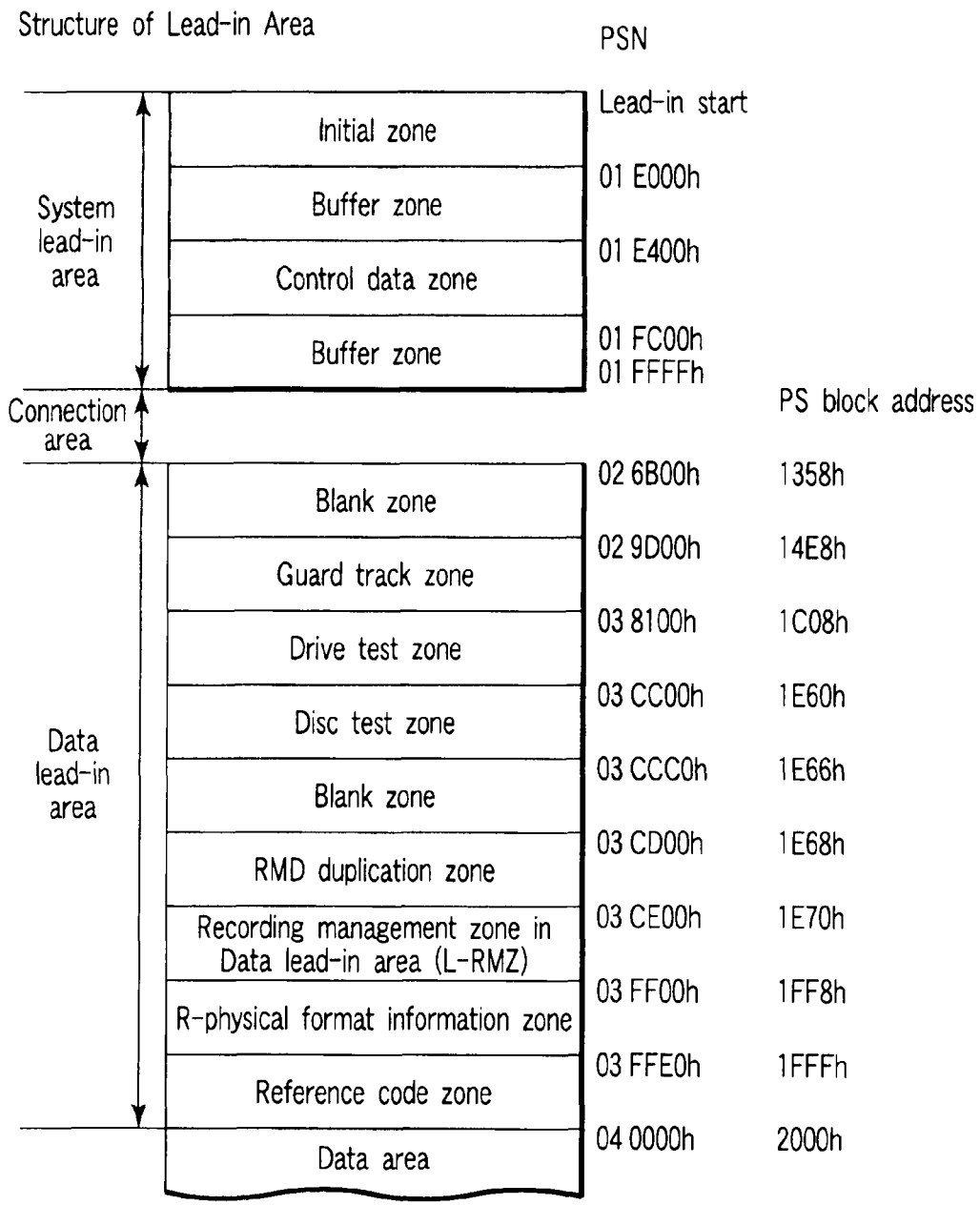
FIG. 3 is an exemplary view showing a configuration of the lead-in area of the optical disc shown in FIG. 1.

FIG. 3 is an exemplary view showing a configuration of the lead-in area of the optical disc shown in FIG. 1. As exemplified in FIG. 3, system lead-in area SLA of Layer 0 is composed of an initial zone, a buffer zone, a control data zone, and a buffer zone in sequence from the inner peripheral side. The data lead-in area of Layer 0 is composed of a blank zone, a guard track zone, a drive test zone, a disc test zone, a blank zone, an RMD duplication zone, an L-RMD (recording management zone in the Data Lead-in area), an R-physical format information zone, and a reference code zone in sequence from the inner peripheral side. A starting address (inner peripheral side) of the data area of Layer 0 (L0) and an ending address (inner peripheral side) of the data area of Layer 1 (L1) are shifted by a distance of a clearance, and the ending address (inner peripheral side) of the data area of Layer 1 is at a side outer than the starting address (inner peripheral side) of the data area of Layer 0.

<<Structure of Lead-in Area>>

FIG. 3 exemplifies a configuration of the lead-in area of Layer 0 (L0). The system lead-in area is composed of an initial zone, a buffer zone, a control data zone, and a buffer zone in sequence from the inner peripheral side. The data lead-in area is composed of a blank zone, a guard track zone, a drive test zone, a disc test zone, a blank zone, an RMD duplication zone, a recording management zone in the data lead-in area (L-RMD), an R-physical format information zone, and the reference code zone in sequence from the inner peripheral side.

<<Details of System Lead-in Area>>

The initial zone contains embossed data segments. The main data of the data frame recorded as the data segment of the initial zone is set to "00h". The buffer zone is formed of 1024 Physical sectors from 32 Data segments. The Main data of the Data frames eventually recorded as Data segments in this zone is set to "00h". The Control data zone contains embossed Data segments. The Data segments contain embossed Control data. The Control data is comprised of 192 Data segments starting from PSN 123904 (01 E400h).

Figure 4:
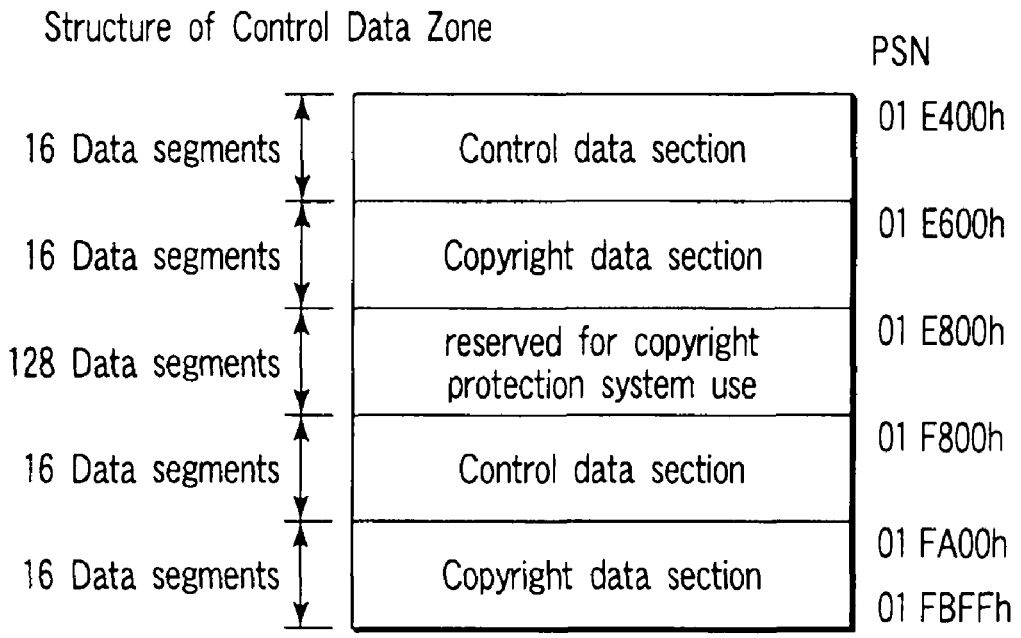
FIG. 4 is an exemplary view showing a configuration of the control data zone shown in FIG. 3.
Figure 5:
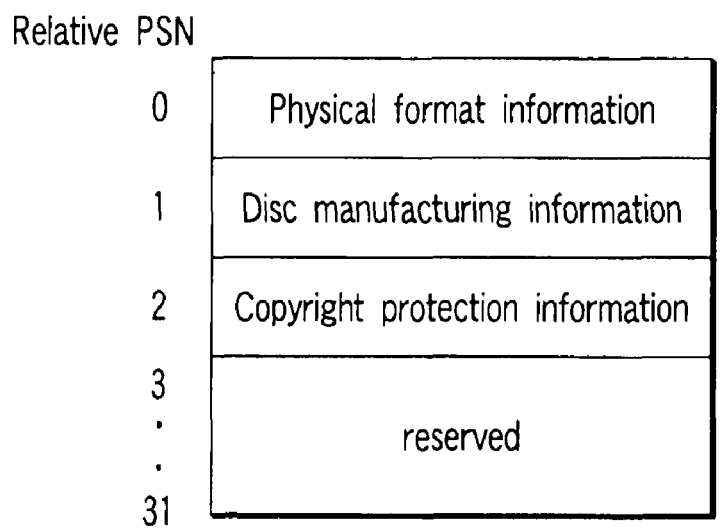
FIG. 5 is an exemplary view showing a structure of one of the data segments shown in FIG. 4.

FIG. 4 exemplifies a configuration of the control data zone, and FIG. 5 exemplifies a structure of the data segment of the control data section. The contents of the first Data segment in a Control data section is repeated 16 times. The first Physical sector in each Data segment contains the physical format information. The second Physical sector in each Data segment contains the disc manufacturing information. The third Physical sector in each Data segment contains the copyright protection information. The contents of the other Physical sectors in each Data segment are reserved for system use.

FIG. 6 exemplifies the physical format information in the control data section of FIG. 5, and FIG. 7 exemplifies the data area allocation of the physical format information. The contents of description of respective bite positions (BP) for the physical format information are as follows. The values specified for the Read power, Recording speeds, Reflectivity of Data area, Push-pull signal, and On-track signal given in BP 132-154 are only for example. Their actual values may be determined by a disc manufacture provided that the values are chosen within the values satisfying the emboss condition and the recorded user data characteristics. The details of the data area allocation given in BP 4-BP15 are shown in FIG. 7, for example.

BP149 and BP152 of FIG. 6 specify reflectance ratios of the data areas of Layer 0 and Layer 1. For example, 0000 1010b denotes 5%. An actual reflectance ratio can be specified by the following formula:

Actual reflectance ratio=value×(½).

BP150 and BP153 specify push-pull signals of Layer 0 and Layer 1. In respective BP's, bit b7 (not shown) specifies a track shape of the disc of each layer, and bits b6 to b0 (not shown) specify amplitudes of the push-pull signals as:

| Track shape: | 0b (track on a groove) |
| --- | --- |
|  | 1b (track on a land) |

Push-pull signal: 010 1000b denotes 0.40, for example.
An actual amplitude of a push-pull signal is specified by the following formula:

Actual amplitude of push-pull signal=value×(¹⁄₁₀₀).

BP151 and BP154 specify amplitudes of on-track signals of Layer 0 and Layer 1:
On-track signal: 0100 0110b denotes 0.70, for example.
An actual amplitude of an on-track signal is specified by the following formula:

Actual amplitude of on-track signal=value×(¹⁄₁₀₀).

Incidentally, recording-related parameters for L0 as exemplified by FIG. 8 may be described at BP512 to BP543 of the physical format information. Information of the initial peak power and/or bias power, etc. for the L0 layer recording can be obtained from the description of FIG. 8. Further, recording-related parameters for L1 as exemplified by FIG. 9 may be described at BP544 to BP2047 of the physical format information. Information of the initial peak power and/or bias power, etc. for the L1 layer recording can be obtained from the description of FIG. 9.

An evaluation disc of recordable dual-layered optical disc 100 according to one embodiment can be made as follows. More specifically, on transparent resin substrate 101, a 1.2 wt % TFP solution of an organic dye is applied by spin coating to form L0 recording layer 105. The thickness of the dye after application from the bottom of the groove is set to be 60 nm. Reflecting film 106 of an Ag alloy with 25 nm thick is laminated or stacked on the dye-coated substrate by sputtering, and intermediate layer 104 of 2P (photo polymer) resin with 25 μm thickness is spin-coated. A separately prepared polycarbonate stamper is placed thereon to transfer the groove shape, and the stamper is removed. On the 2P resin intermediate layer 104 thus prepared, a 1.2 wt % TFP solution of an organic dye is applied by spin coating to form L1 recording layer 107. Reflection or reflective film 108 of an Ag alloy is laminated or stacked thereon with a thickness of 100 nm by sputtering, and pasted with 0.59 mm thick transparent resin substrate 102 by using UV hardening resin 103.

Using the information storage medium (a single-sided dual-layer evaluation disc) produced as described above, an experiment for evaluating a reproduction signal is performed.

Figure 10:
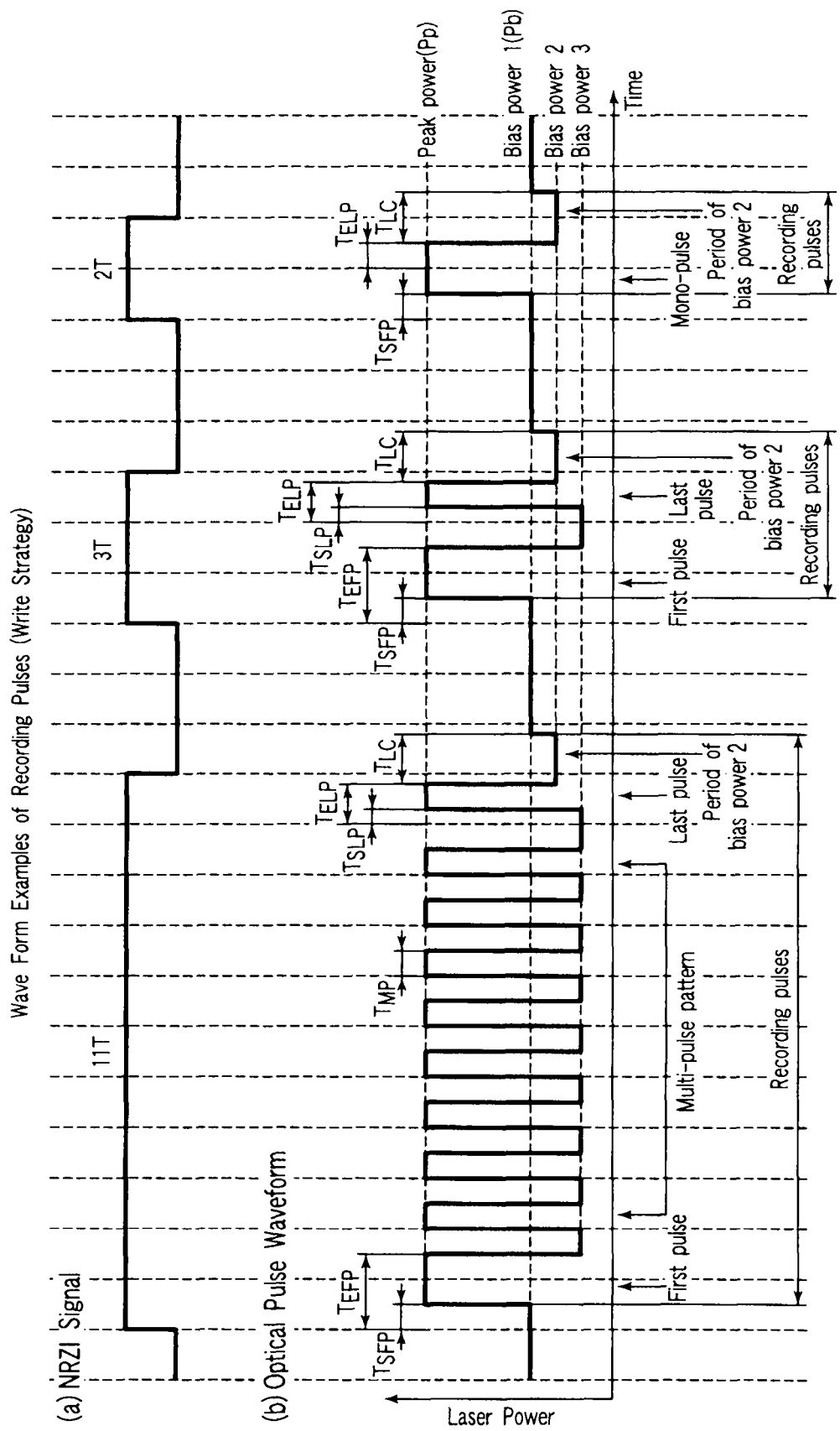
FIG. 10 is an exemplary view showing a waveform (Write Strategy) of a recording pulse.

The apparatus used for evaluation is optical disc evaluation apparatus ODU-1000 manufactured by Pulstec Industrial Co., Ltd. This apparatus has a laser wavelength of 405 nm and NA of 0.65. The linear velocity in recording and reproduction is selected to be 6.61 m/s. A recording signal is 8-12 modulated random data, and information is recorded by using a laser waveform containing a given recording power and two bias powers 1 and 2 as shown in FIG. 10. The recording conditions applied to the evaluation are as follows.

Explanation on Recording Conditions (Information of Write Strategy)

Referring to FIG. 10, a description will be given with respect to a recording waveform (exposure condition at the time of recording) used when the optimal recording power is checked. The exposure levels at the time of recording have four levels of recording power (peak power), bias power 1, bias power 2, and bias power 3. When long (4 T or more) recording mark 9 is formed, modulation is carried out in the form of multi-pulses between recording power (peak power) and bias power 3. In the embodiment, in any of the H format and B format systems, a minimum mark length relevant to channel bit length T is obtained as 2 T. In the case where the minimum mark of 2 T is recorded, one write pulse of the recording power (peak power) level after bias power 1 is used as shown in FIG. 34, and bias power 2 is temporarily obtained immediately after the write pulse. In the case where 3 T recording mark 9 is recorded, bias power 2 is temporarily used after exposing two write pulses, a first pulse and a last pulse of recording power (peak power) level that follows bias power 1. In the case where recording mark 9 having a length of 4 T or more is recorded, bias power 2 is used after the exposure is made with multi-pulse and write pulse.

The vertical dashed line in FIG. 10 shows a channel clock cycle (T). When a 2 T minimum mark is recorded, the laser power is raised at a position delayed by TSFP from the clock edge, and fallen at a position delayed by TELP from the one-clock passing portion. The just-subsequent cycle during which the laser power is set at bias power 2 is defined as TLC. Values of TSFP, TELP, and TLC are recorded in physical format information PFI contained in control data zone CDZ in the case of the H format.

In the case where a 3 T or more long recording mark is formed, the laser power is risen at a position delayed by TSFP from the clock edge, and lastly, ended with a last pulse. Immediately after the last pulse, the laser power is kept at bias power 2 during the period of TLC. Shift times from the clock edge to the rise/fall timing of the last pulse are defined as TSLP, TELP. In addition, a shift time from the clock edge to the fall timing of the last pulse is defined as TEFP, and further, an interval of a single pulse of the multi-pulse is defined as TMP.

Each of intervals TELP-TSFP, TMP, TELP-TSLP, and TLC is defined as a half-value wide relevant to the maximum value. In addition, in the embodiment, the above parameter setting ranges are defined as follows:

$$0.25\ T \leq TSFP \leq 1.50\ T \quad (eq.\ 01)$$

$$0.00\ T \leq TELP \leq 1.00\ T \quad (eq.\ 02)$$

$$1.00\ T \leq TEFP \leq 1.75\ T \quad (eq.\ 03)$$

$$-0.10\ T \leq TSLP \leq 1.00\ T \quad (eq.\ 04)$$

$$0.00\ T \leq TLC \leq 1.00\ T \quad (eq.\ 05)$$

$$0.15\ T \leq TMP \leq 0.75\ T \quad (eq.\ 06)$$

Further, in the embodiment, the values of the above described parameters can be changed or modified according to the recording mark length (Mark Length) and the immediately preceding/immediately succeeding space length (Leading/Trailing space length).

For the recordable information storage medium whose recording is to be performed based on the recording theory of the embodiment, parameters of the optimum recording power are investigated. The result is that the values of bias power 1, bias power 2, and bias power 3 are 2.6 mW, 1.7 mW, and 1.7 mW, respectively, and reproduction power is 0.4 mW.

Optimum recording conditions (information of Write Strategy) can be determined with an apparatus (disc drive) by which a test writing has been done at a drive test zone according to the respective parameter values as mentioned above.

Figure 11:
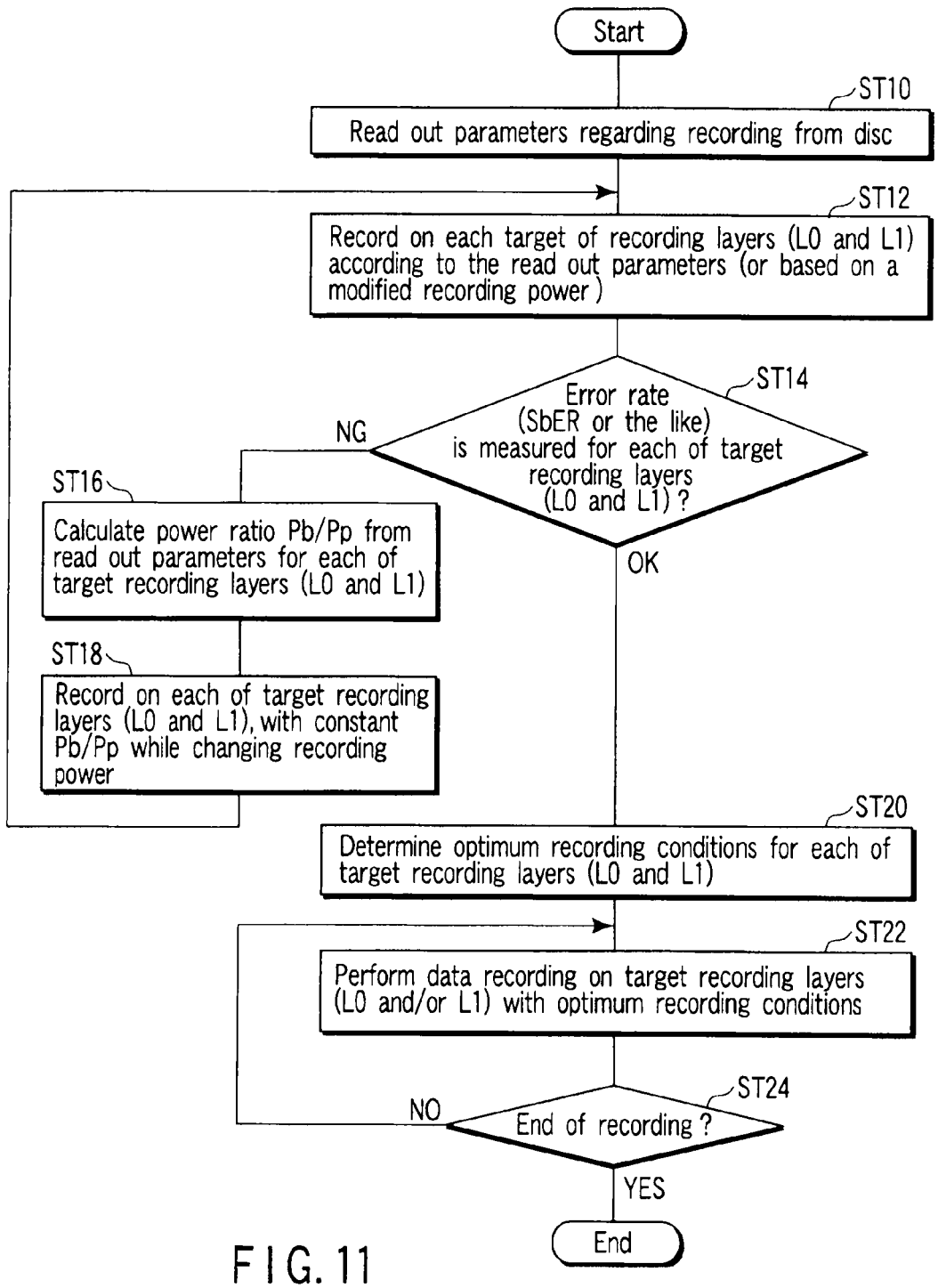
FIG. 11 is an exemplary flowchart for explaining a recording method according to one embodiment.

FIG. 11 is an exemplary flowchart for explaining a recording method according to one embodiment. In the following an example of determining the optimum recording condition for dual-layer optical disc 100 will be described with reference to this flowchart. First, recording-related parameters (cf. FIGS. 6 to 9) are obtained from the data described in system lead-in area SLA (ST10).

To minimize as much as possible the time for determining the recording condition, the read-out parameters are used for test recording (for example, the values of peak power Pp and bias power Pb in FIG. 8 are used for test recording of layer L0, and the values of peak power Pp and bias power Pb in FIG. 9 are used for test recording of layer L1) (ST12). Then, the bit error rate (SbER) of a reproduction signal from the test recording portion is measured. When the result of measured SbER is more wrong than a predetermined threshold value (e.g., 5.0 e-5) (NG at ST14), the value of Pb/Pp is calculated (ST16) from the parameters described in the data read-out from the system lead-in. Subsequently, the recording power is changed with constant Pb/Pp (ST18), and new test recording is done using the changed recording power (ST12). Thereafter, similar measuring process for SbER (processing loop of ST12 to ST18) is repeated to grope for or to find out the optimum recording condition.

When the measured SbER is better than the threshold value (e.g., 5.0 e-5) (OK at ST14), it is determined that the recording condition providing the measured result is an optimum recording condition (ST20). Then data recording is started for the tested target recording layer (L0 and/or L1). The data recording is continued with the optimum recording condition determined at ST20 (ST22, no at ST22).

Although SbER is used for determining whether the test recording condition is suitable, another index (such as data error rate and/or information (such as PRSNR) relating to a signal to noise ratio) may be used so long as the index can be used for evaluating the recording quality.

In the embodiment, physical format information in the system lead-in (and/or in lead-out) of the information storage medium is read out first, and test recording is done using the parameters being set by the read-out information. However, the test recording may be done with a default constant value of Pb/Pp, and subsequently, optimizing processing to grope for the optimum recording condition may be performed while changing the recording power suitably.

In the embodiment, parameters of the used Pb/Pp may be newly recorded in the information storage medium, and the newly recorded parameters may be read out to be used for the subsequent recording. By so doing, the time for optimizing processing can be made shorter than before.

In the embodiment, parameters already recorded on the information storage medium are read out and used. However, a recorder apparatus (or a disc drive) may have a memory (ROM) in which recorded is a list of information items of Pb/Pp applied to typical disc models (or grades) any of which will possibly be used for the apparatus (or the drive).

In the embodiment, data in the system lead-in is used for the information reading from the disc. However, other one such as data recorded in a wobble signal may be used.

Figure 12:
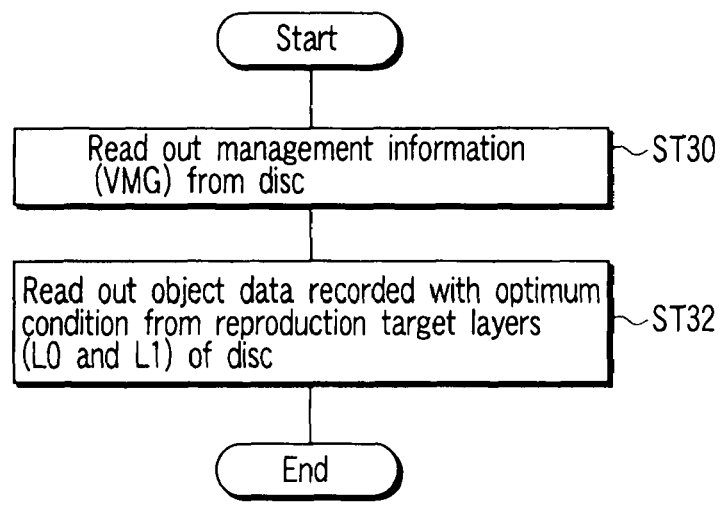
FIG. 12 is an exemplary flowchart for explaining a reproducing method according to one embodiment.

FIG. 12 is an exemplary flowchart for explaining a reproducing method according to one embodiment. In reproduction processing, management information (such as VMG in FIG. 1(e)) of the recorded contents is read out (ST30) from the prescribed track of optical disc 100 on which recording is done with the optimum recording condition obtained based on the processing of FIG. 11. The related object data (video object VOB, stream object SOB, or the like) is reproduced based on the contents described in the read-out management information (ST32).

As explained with reference to FIG. 11, when information recording is performed on a multi-layer optical disc, the ratios of the recording power (peak power) to the bias power are set to be different among respective recording layers, and the preset ratios of the recording power to the bias power are used for the respective recording layers. By so doing, it is possible to find out a suitable recording condition (for instance, a condition to make the error rate lower than a predetermined threshold value determined in view of practical use or the like where the recording wavelength and recording waveform is fixed for respective layers) with a relatively short period of time. This is because, in multi-layered recording layers, aberrations of the laser light and/or thermal influence of the information storage medium may be different among respective layers, or differences are found in the distances from the laser spot to the recording layers (the differences depend on whether or not a light passing through other semi-transparent recording layer is to be used), so that the relations between the bias power and the recording power become different among the layers. From this, optimizing is to be independently performed for each of the layers.

Figure 13:
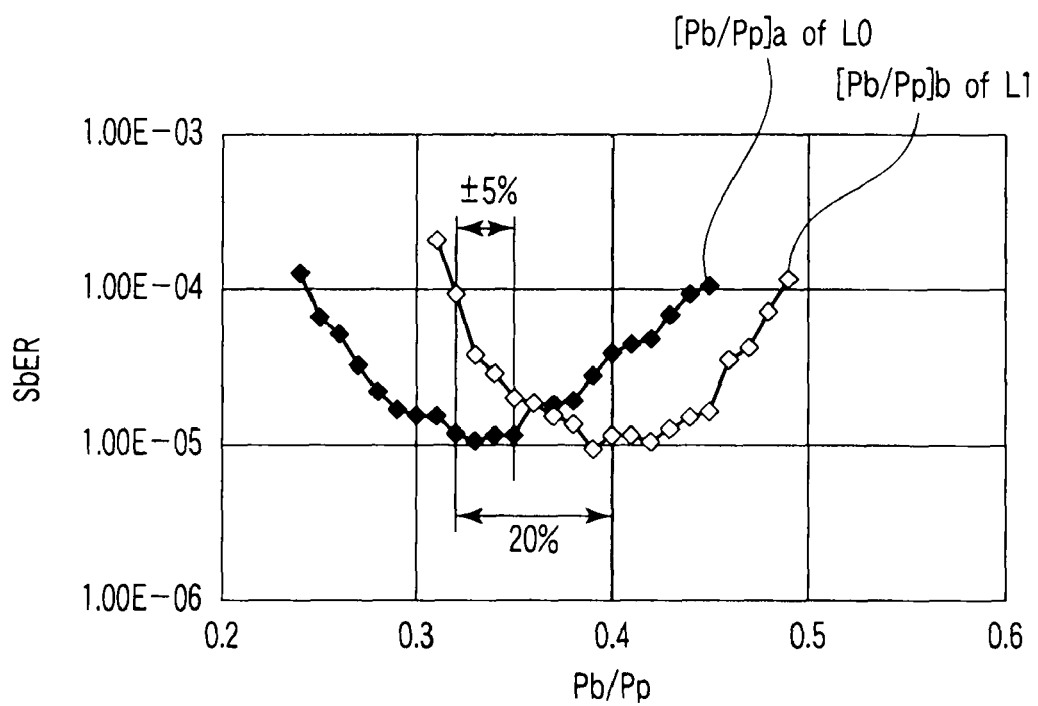
FIG. 13 is a view for explaining an example of recording on a single-sided dual-layer optical disc wherein the power ratio for the L0 layer differs from that for the L1 layer.

FIG. 13 shows data supporting the above discussion. FIG. 13 exemplifies a case wherein at least ±5% (about 20% in the illustrated example) of difference is found between the curve of error rate SbER vs power ratio [Pb/Pp]a for layer L0 and that of error rate SbER vs power ratio [Pb/Pp]b for layer L1 when recording is done using single-sided dual-layer optical disc 100.

SUMMARY

An information recording method is applied to a recordable information storage medium (such as a recordable or rewritable optical disc) comprising at least a substrate, two or more recording layers sandwiching an intermediate layer, and a groove coaxially or spirally formed on the substrate. In this method, information is recorded on the information storage medium using a laser whose output power is modulated. When the maximum high power (peak power) used for forming a mark portion is represented by Pp and the light power (bias power) used for forming a space portion is represented by Pb, the ratio Pb/Pp of one of the recording layers (L0, L1, etc.) is set to be different from another one of the recording layers.

To achieve a quick start of information recording (or to reduce a waiting time as much as possible from the disc loading to the drive to a state in which actual data recording can be started), pre-recorded physical format information (including information of the recording power, etc.) is read out from the optical disc, and the ratio Pb/Pp to be used is determined based on the read-out information. This Pb/Pp may be obtained directly from the optical disc, or may be calculated from the recording power (peak power) and the bias power respectively read out from the disc.

A recordable or rewritable optical disc according to one embodiment comprises at least a substrate, two or more recording layers sandwiching an intermediate layer, and a groove coaxially or spirally formed on the substrate. Information is recorded on the optical disc by modulating the output power of a laser. When the maximum high power (peak power) used for forming a mark portion is represented by Pp and the light power (bias power) used for forming a space portion is represented by Pb, the ratio Pb/Pp of one of the recording layers (L0, L1, etc.) is set to be different from another one of the recording layers.

At least information of the recording power and the bias power for respective recording layers is stored in the optical disc. The ratio of the recording power (peak power) to the bias power described for one layer differs from that for another layer. From the stored information of the recording power and the bias power for each of the layers, it is possible to obtain the optimum recording condition for each of the layers with a relatively short period of time (when compared with a case wherein no such information is available).

A recording method according to the embodiment is particularly effective when a recordable optical disc (in which only one recording is allowed for the same recording portion) is used. When a single-sided dual-layer optical disc is used, it is better to select a condition that the bias power for recording the second layer (L1) is higher than that for recording the first recording layer (L0) which is nearer to the optical reception surface than L1.

While certain embodiments of the inventions have been described, these embodiments have been presented by way of example only, and are not intended to limit the scope of the inventions. Indeed, the novel methods and systems described herein may be embodied in a variety of other forms. For instance, the invention (including an idea of obtaining the optimum recording condition using different power ratios for respective recording layers) can be reduced to practice not only in a dual-layer R (recordable or write-once) disc, but in a multi-layer RW (rewritable) disc or in a multi-layer RAM disc.

Furthermore, various omissions, substitutions and changes in the form of the methods and systems described herein may be made without departing from the spirit of the inventions. The accompanying claims and their equivalents are intended to cover such forms or modification as would fall within the scope and spirit of the inventions.

What is claimed is:

1. An optical disc comprising a recording layer, the recording layer being configured to store information by using a peak power and a particular power arranged next to or subsequent to the peak power, a power level of the particular power being lower than that of the peak power, wherein the optical disc includes a parameter information area, the parameter information area includes parameter information relating to a ratio of a numerator corresponding to the particular power to a denominator corresponding to the peak power.

2. A method of recording information on an optical disc comprising a recording layer, the recording layer being configured to store information by using a peak power and a particular power arranged next to or subsequent to the peak power, a power level of the particular power being lower than that of the peak power, wherein the optical disc includes a parameter information area, the parameter information area includes parameter information relating to a ratio of a numerator corresponding to the particular power to a denominator corresponding to the peak power, the method comprising:

obtaining the parameter information from the parameter information area; and recording information on the recording layer according to the obtained parameter information.

3. A method of recording information on an optical disc comprising a recording layer, the recording layer being configured to store information by using a peak power and a particular power arranged next to or subsequent to the peak power, a power level of the particular power being lower than that of the peak power, wherein the optical disc includes a parameter information area, the parameter information area includes parameter information relating to a ratio of a numerator corresponding to the particular power to a denominator corresponding to the peak power, the method comprising:

recording information on the disc.

4. A method of reproducing information from a single-sided dual-layer optical disc comprising a recording layer, the recording layer being configured to store information by using a peak power and a particular power arranged next to or subsequent to the peak power, a power level of the particular power being lower than that of the peak power, wherein the optical disc includes a parameter information area, the parameter information area includes parameter information relating to a ratio of a numerator corresponding to the particular power to a denominator corresponding to the peak power, the method comprising:

reading management information from the disc; and reading recorded information from the disc.

* * * * *